US005978493A

United States Patent [19]

Kravitz et al.

[11] Patent Number: 5,978,493

[45] Date of Patent: Nov. 2, 1999

[54] IDENTIFICATION BRACELET FOR CHILD AND GUARDIAN MATCHING

[75] Inventors: Jeff Kenneth Kravitz, Yorktown Heights; Elaine Rivette Palmer, Goldens Bridge, both of N.Y.

[73] Assignee: International Business Machines Corporation, Armonk, N.Y.

[21] Appl. No.: 08/767,730

[22] Filed: Dec. 16, 1996

[51] Int. Cl.[6] .............................. G06K 9/00; B42D 15/00

[52] U.S. Cl. .............................................. 382/115; 283/75

[58] Field of Search .................................... 382/115, 118; 283/75, 74, 72, 900; 380/23, 25

[56] References Cited

U.S. PATENT DOCUMENTS

| | | | |
|---|---|---|---|
| 4,328,978 | 5/1982 | McLaughlin | 283/7 |
| 4,544,184 | 10/1985 | Freund et al. | 283/94 |
| 4,556,883 | 12/1985 | Strietzel | 340/825.54 |
| 5,044,955 | 9/1991 | Jagmin | 433/229 |
| 5,181,786 | 1/1993 | Hujink | 400/61 |
| 5,214,669 | 5/1993 | Monroe et al. | 380/23 |
| 5,214,699 | 5/1993 | Monroe et al. | 380/23 |
| 5,357,700 | 10/1994 | Schulte | 40/301 |
| 5,364,133 | 11/1994 | Hofer et al. | 283/75 |
| 5,423,574 | 6/1995 | Forte-Pathroff | 283/75 |
| 5,432,864 | 7/1995 | Lu et al. | 382/118 |

*Primary Examiner*—Jose L. Couso
*Assistant Examiner*—Duy M. Dang
*Attorney, Agent, or Firm*—Robert P. Tassinari

[57] ABSTRACT

Information including images of the parent and child are stored in an integrated circuit device in a child's watch or bracelet. The device contains write only once, non-volatile, storage and contacts for coupling the device to data entry and reader stations. At the time of entry into a protected facility, information identifying the child and guardian, along with digitized photos of the child and the guardian, are stored in the non-volatile storage at an entry station. Once the identification information is written into the device at the entry station, the child's watch or bracelet is attached with a tamper proof seal to the child in such a way that it cannot be easily removed by the child. If, while in the protected premises, the child is lost, found and taken to a security station, the watch is removed from the child and placed in the reader at that station and the information retrieved. This information is used to comfort the child by name, to contact the parents at their hotel and to verify the parents identities through their photographs when they come to pick up the child.

20 Claims, 3 Drawing Sheets

IDENTIFICATION BRACELET FOR CHILD AND GUARDIAN MATCHING

FIELD OF THE INVENTION

The present invention relates to child identification and more particularly, to matching children to their guardians.

BACKGROUND OF THE INVENTION

One great fear of parents when taking children to public and semi-public facilities, or leaving children in the custody of a care giver, is that the children will be lost, either because they will wander away from the parent or care giver, or they will be given by the care giver to a stranger. Even though great care is taken in the care of children, the media is replete with stories about children that are lost or lured away by strangers. Sometimes it is only after the child has been missing for some time that the parents or adults responsible for the child care realize the child is absent. Further, a lost child in fear of strange adults will fail to provide the finder with the necessary information to unite it with its parent.

In view of these problems, it is common in recreation areas catering to children that children and accompanying adults be marked. On entry to the recreation area, matching marks are provided on the hands of adult and child. When leaving the facility, the hands of the adult and child are checked for presence of the identical marks. More sophisticated techniques along this line have also been suggested. U.S. Pat. No. 5,423,574, entitled "Child Loss Prevention System and Method of Use", discloses that matching bracelets with tamper resistant seals be worn by the parent and the child to enable uniting lost children with their rightful guardian or verification of the adult/child relationship when exiting the recreation area. If the seals of the bracelets of the child or adult have been tampered with, the child is not immediately turned over to the adult. However, this does not prevent abduction by removal of the child's bracelet and replacement with one that matches the abductors. Further, while the child bracelet provides means for matching guardian and child, it requires the guardian also wear the bracelet for proper identification. It is apparent that a more sophisticated identification scheme is needed, one which is more difficult to counterfeit.

A number of schemes have been suggested for using image information such as photographs, or digitally encoded data on identification cards such as driving license and credit cards to verify the identity of the card owner or user of the drivers license. For instance, U.S. Pat. No. 5,181,786 entitled "Method and Apparatus for Producing Admission Tickets" discloses admission tickets that contain machine readable tag information encapsulated with a photograph or other human readable document in a special plastic foil sandwich; U.S. Pat. No. 5,214,699 entitled "System for Decoding and Displaying Personalized Identification Stored on a Memory Device" discloses a method of encrypting video data information on a stored memory device to prevent forging or tampering with the video data; and U.S. Pat. No. 5,432,864 entitled "Identification Card Verification System" discloses a method of verifying digitized photographic images.

BRIEF DESCRIPTION OF THE INVENTION

In accordance with the present invention information including images of both the parent and child are stored in the same integrated circuit device. The device contains write only once, non-volatile, storage and mechanical contacts (or RF or optical coupling means for radiated signals) for coupling the device to data entry and reader stations. At the time of entry into a protected facility, information such as both the child's and guardian's names, their address and ages, along with digitized photos of the child and the guardian, and if far from home, the name and telephone number of the hotel where they are staying, are stored in the non-volatile storage at an entry station. The entry station has a small computer or PC, a video camera for taking the digitized pictures and a semiconductor chip personalization device to allow information to be written onto the chip. Once the identification information is written into the semiconductor chip at the entry station, the chip which is embedded in a child's watch or bracelet, is attached with a tamper proof seal to the child in such a way that it cannot be easily removed by the child.

If, while in the protected premises, the child is lost, found and taken to a security station, the watch is removed from the child and placed in the reader station and the information retrieved. This information is used to comfort the child by name and to contact the parents or guardian at their hotel and to verify the parents identities through their and their child's photograph when they come to pick up the child. This arrangement also allows for automated record keeping of the incident. The information and digitized images of the child and parent can be stored in a centralized database. Further, the image of the child can be displayed on television screens in the protected facility to help in finding the child and to inform parents about the finding of the child.

When the child and guardian leave the facility, the watch or bracelet is removed from the child and the images of the child and guardian are compared. If upon examination at the exit gate it appears that the tamper proof seal has been tampered with or broken, the child and guardian are detained until a positive identification can be provided. Once the child and parent have been identified, the watch or bracelet is returned to the child to be taken home as a souvenir.

Therefore it is an object of the present invention to provide a new means for personal identification.

It is another object of the present invention to provide an apparatus to identify lost children and/or match children with their guardian.

It is a further object of the invention to provide an identification bracelet that is more difficult to counterfeit.

BRIEF DESCRIPTION OF THE DRAWINGS

These and other objects of the invention can best be understood by the following written description of an embodiment of the invention when read with the accompanying drawings of which.

DETAILED DESCRIPTION OF THE INVENTION

Figure 1:
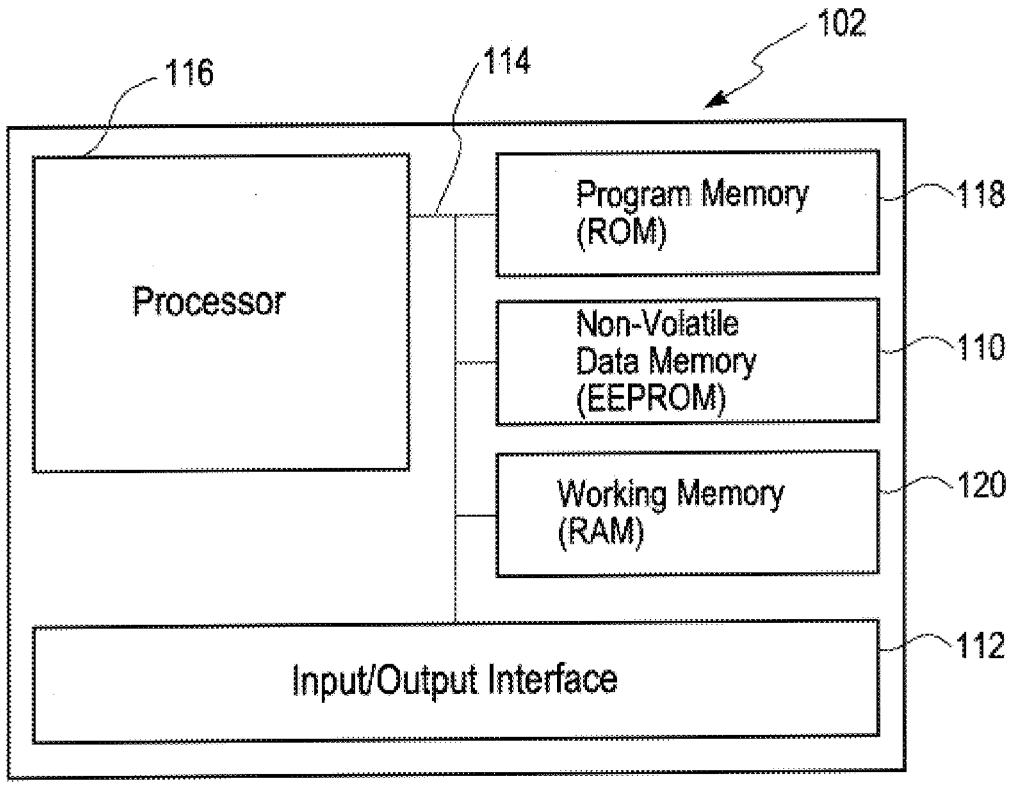
FIG. 1 is a block diagram of a semiconductor device for use in an embodiment of the invention.

As shown in FIG. 1, a semiconductor device 102 for use with the present invention minimally contains a non-volatile data memory 110, such as an EEPROM, for storing data and an input/output interface 112 to enter data onto and to read data from the device. The data to be entered, including the image data, is stored in the EEPROM 110 through the input/output interface 112 and the data bus 114. In more sophisticated systems, the chip may include a microprocessor 116 for performing functions; a read only memory 118 containing the processor operating system and a program for personalizing the EEPROM; a random access memory 120 for entering programming steps and data received through the input/output interface 112.

Figure 2:
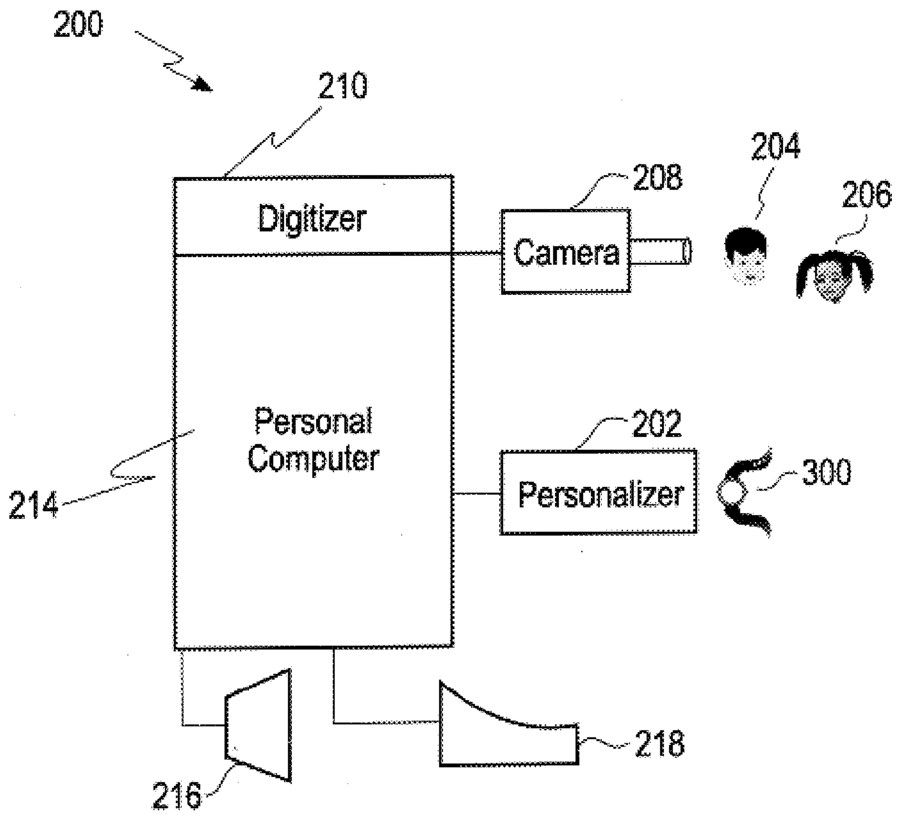
FIG. 2 is a schematic diagram of a data entry station for use with the present invention.
Figure 3:
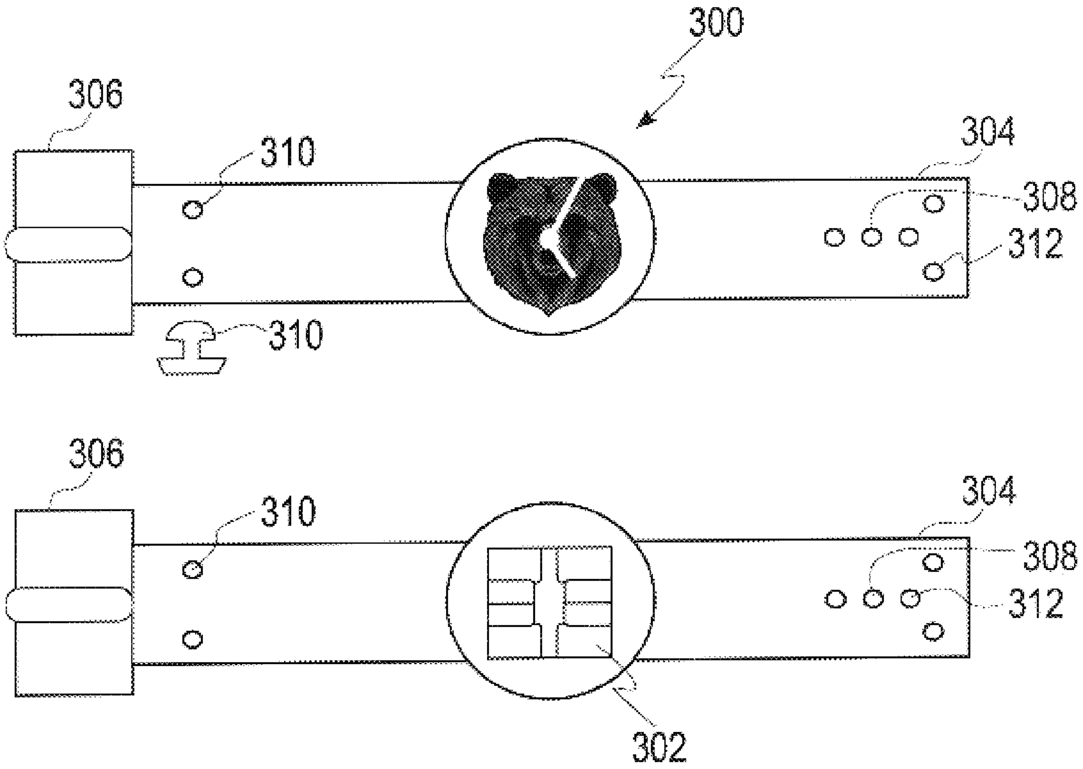
FIG. 3 is a plan view of the back and front of an identification bracelet encapsulating the semiconductor device.

When the child and guardian are about to enter the facility, they are brought to the personalization or data entry station 200, shown in FIG. 2. A wrist band in the form of a bracelet or watch containing the semiconductor device of FIG. 1 is placed in the personalizer 202 at the station. As shown in FIG. 3, the back of the bracelet or watch 300 contains contacts 302 for making electrical contact to connections in the personalizer that connect the semiconductor device to the entry station processor. The child 204 and the guardian 206 are placed in front of the camera 208 and their images recorded and then digitized by a video digitizer 210 at the station. The computer 214 at the station 202 compresses the data and then places it on the EEPROM memory 110 through the chip personalizer 202 at the station.

The insertion of the watch 300 into the personalizer or alternatively the system operator activates the personal computer 214 which then presents, on a display 216 of the personal computer, a number of questions to be asked of the guardian 206. As each question is answered, the operator enters the information in computer keyboard 218, the processor stores the information on the chip 102, and the next question is presented on the display to be answered by the guardian. Information such as the guardian's home address, the local hotel address, home telephone number and the child's and guardian's name are requested and entered into the computer and onto the EEPROM. When the information is complete, the watch is removed from the chip personalizer 202 and a protective cover is placed over the contacts 302 on the back of the child's watch. If electromagnetic radiation devices are used in place of mechanical contacts, the protective cover can be of a material that is transparent to such radiation, eliminating the need for removal during the personalization and reading operations.

The watch 300 has a strap 304 with a standard clasp and hole arrangement 306 and 308 respectively. The watch is placed on the child's arm with the chip in it and tightened around the child's wrist. In addition to the standard clasp and hole arrangement, the band has two locking elements 310 which are forced through smaller holes 312 in the band 304 to prevent removal of the watch by the child.

Figure 4:
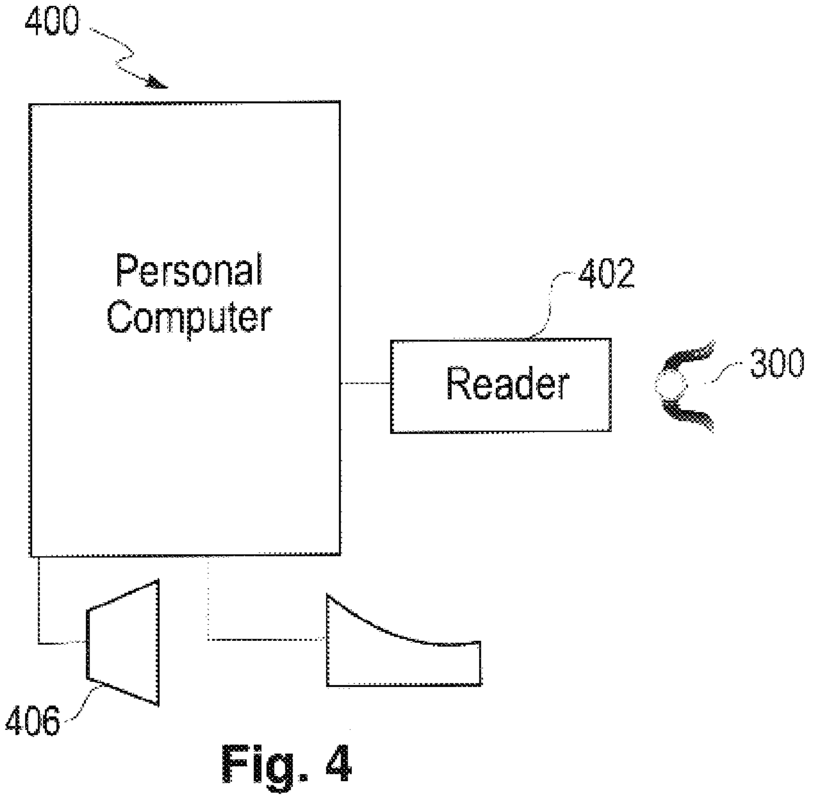
FIG. 4 is a reader station for use with the present invention.

At the read station 400 shown in FIG. 4, the locking elements 310 are clipped from the watch 300; the watch removed from the child and the back cover of the watch snapped open. The back of the watch is then placed against the reader 402 so that the contacts 302 make contact with probes at the reader station. This activates the computer 404 at the read station to read data out of the chip and into the read station. Image information and/or the child/parent data is brought up on the screen 406. In case the child is lost, the data about the child and the child's family are brought onto the display screen 406 so the child can be identified and his parents called and notified. Data as to the finding of the child can be entered into the central data base for the facility for handling calls from distraught parent to confirm that the child has been located. When the parents arrive, the images of the child and the parents can be matched to assure that the child is given to the proper inquiring adult.

Unless there is a problem on the way out of the facility, only the child's and guardian's pictures are presented side by side for quick confirmation that the proper adult is removing the child from the premises. Since the locking devices 308 have been removed from the watch by a guard at the exit, the child can take the watch home as a souvenir of his visit to the facility.

Figure 5:
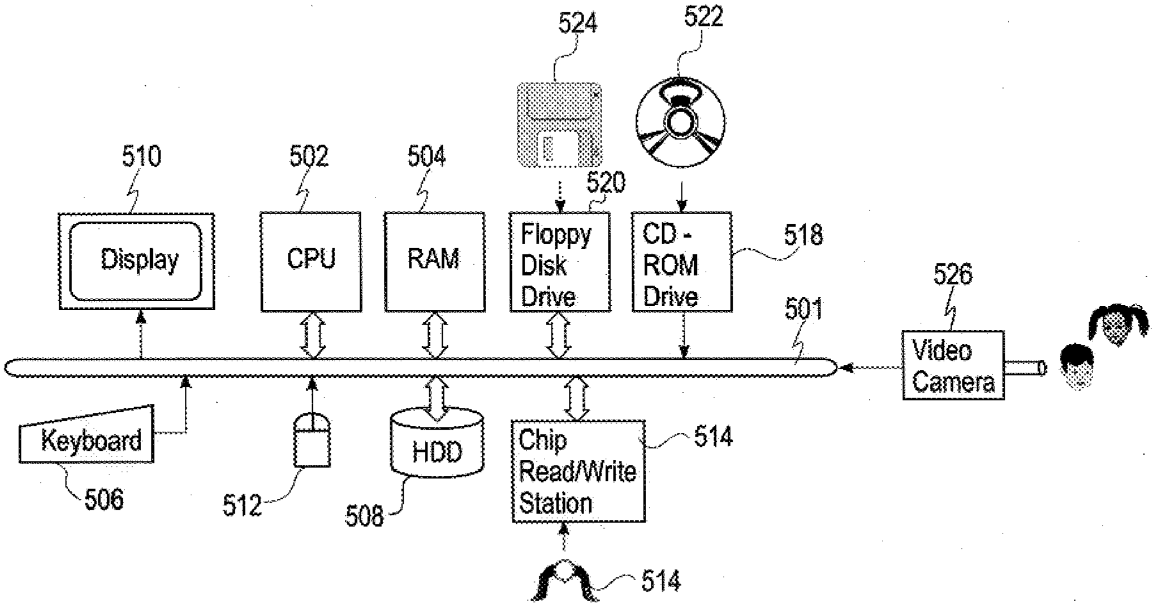
FIG. 5 is a block diagram of typical general purpose computer for use at the data entry and reader stations.

FIG. 5 shows a general purpose computer system 500 for use both in data entry 200 and data retrieval stations 400 of the present invention. The computer system includes a control processing unit 502 connected by a bus 501 to a random access memory 504, a high density storage device 508, a keyboard 506, a display 510 and a mouse 512. Also attached to the CPU 502 by the bus 501, are CD-ROM and magnetic disc drives 518 and 520 for entry of data from optical and floppy magnetic discs 522 and 524 containing programming code and data for use with the present invention. The chip read/write device 514 is attached to the data bus 501 to perform the personalization and data reading functions of the present invention in connection with the chip in the bracelet 516. Also, the video camera and digitizer 526 are connected to the data bus for transmission of digitized information to the processing unit for compression of the images. A data link connects the station to the facilities central computer system for entry of data into the central database.

Above one embodiment of the present invention has been described. However, a number of a modifications may be made in this embodiment. For instance, the device could be used in hospitals for identification of patients who are drugged or comatose and for recording medication prescribed and/or administered to the patient. Further, the data may be encoded so that unscrupulous individuals will not use it for illegal purposes, and to make it more difficult for kidnappers to forge the data. Therefore it should be understood that these and other modifications of the present invention will be readily apparent to those skilled in the art and that various changes, adaption and modifications may be made therein without departing the spirit of the invention and the scope of the appended claims.

What we claim is:

1. Apparatus for preventing misidentification of an individual and the individual's guardian comprising:

an identification bracelet for affixing to the individual, said identification bracelet including semiconductor means containing information in digital form about that individual and the guardian for that individual, said information including data about the individual and the guardian and digitized image information of both the individual and the guardian;

a personalization station for entering said information including the digitized images of both the individual and the guardian; and a reading station for confirming the identify of the individual and guardian from the information including images of both the individual and the guardian generated on a computer screen from the digitized image information.

2. The apparatus of claim 1 wherein said identification bracelet affixed to the individual is a children's wrist watch including write once nonvolatile programmable storage therein, said watch including a removable tamper proof seal for assuring a child wearing the wrist watch does not remove the watch at the premises.

3. The apparatus of claim 2 including means in the reading station at exit for the public facility for removing the removable means.

4. The apparatus of claim 3 wherein said information is encoded to prevent misuse.

5. The apparatus of claim 1 wherein said identification means, personalization station means and reading station means have mechanical contact means to connect the identification means to the two station means for the transfer of data to and from the identification means.

6. The apparatus of claim 1 wherein said identification means is a wrist band with a case thereon containing the semiconductor device.

7. The apparatus of claim 6 wherein said identification bracelet, the personalization station, and the reading station have electromagnetic coupling apparatus for transferring data to and from the identification bracelet using a radiated electromagnetic signal.

8. The apparatus of claim 7 wherein said case has a back which is transparent to the radiated electromagnetic signal for loading data and reading data from the case without removing the back.

9. The apparatus of claim 6 wherein case includes a children's watch face.

10. A method for preventing misidentification of an individual and the individual's guardian at a facility comprising:

affixing to the individual an identification bracelet including a semiconductor device with a storage medium containing information in digital form about that individual and a guardian for that individual, said information including data about the individual and the guardian and digitized image information of both the individual and the guardian;

entering at a personalization station said information including digitized images of both the individual and guardian; and confirming the identity of the individual and guardian before their leaving the facility at a reading station from the information by generating two images from the digitized image information and comparing those images with the physical features of the individuals.

11. The method of claim 10 including the step of providing a removable tamper proof sealing means for assuring the individual does not remove the watch at the premises.

12. The method of claim 10 including the step of restricting exit of the individual from an area only when the individual and guardian are both identified by their images.

13. The method of claim 10 including broadcasting the images of the individual on display screens of the facility if the individual is reported missing or is found without the guardian.

14. The method of claim 13 wherein the digitized image information is a picture of the individual and child together.

15. An identification bracelet for preventing misidentification of an individual and the individual's guardian comprising:

a semiconductor device attached to the bracelet containing information stored in binary data form about that individual and the guardian for that individual, said information including personal data about the individual and the guardian and images of both the individual and the guardian; and an input/output mechanism for first entering said information in binary data form into said semiconductor device at a personalization station and then for reading said information out of said semiconductor device at a reading station to confirm the identify of the individual and guardian by comparing images of the two persons generated on a computer screen from the digitized image information with the physical features of the individual and the guardian.

16. The identification bracelet of claim 15 wherein said identification bracelet is a wrist band with a case thereon containing the semiconductor device.

17. The identification bracelet of claim 16 wherein said case has a back which is transparent to the radiated electromagnetic signals for loading data and reading data from the case without removing the back.

18. The identification bracelet of claim 17 wherein case includes a children's watch face.

19. The identification bracelet of claim 18 wherein said identification bracelet comprises a children's wrist watch including nonvolatile write once programmable storage therein and a removable tamper proof seal for assuring a child wearing the wrist watch does not remove the watch at the premises.

20. The identification bracelet of claim 15 wherein the digitized image information is a picture of the individual and child together.

* * * * *